US012752318B2

(12) United States Patent
Duncan

(10) Patent No.: US 12,752,318 B2
(45) **Date of Patent: *Oct. 6, 2026**

(54) WASTE DISPOSAL SYSTEM

(71) Applicant: Blue Bagger, Inc., Covington, KY (US)

(72) Inventor: Rick Duncan, Covington, KY (US)

(73) Assignee: Blue Bagger, Inc., Covington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/009,211

(22) Filed: Jan. 3, 2025

(65) Prior Publication Data

US 2025/0135513 A1 May 1, 2025

Related U.S. Application Data

(63) Continuation of application No. 18/004,890, filed as application No. PCT/US2021/040862 on Jul. 8, 2021, now Pat. No. 12,220,731.

(60) Provisional application No. 63/050,289, filed on Jul. 10, 2020.

(51) Int. Cl.
*B08B 17/02* (2006.01)
*B64D 11/02* (2006.01)
*E03F 1/00* (2006.01)

(52) U.S. Cl.
CPC ............ *B08B 17/025* (2013.01); *B64D 11/02* (2013.01); *E03F 1/008* (2013.01)

(58) Field of Classification Search
CPC . B64D 11/02; E03F 1/008; B64F 5/30; B08B 17/025
USPC ........................................................... 141/97
See application file for complete search history.

(56) References Cited

U.S. PATENT DOCUMENTS

| | | | | |
|---|---|---|---|---|
| 4,809,391 | A | 3/1989 | Soldatovic | |
| 5,893,398 | A | 4/1999 | Garrett, Jr. | |
| 6,196,274 | B1 * | 3/2001 | Duncan | B08B 17/00 588/259 |
| 9,439,543 | B1 * | 9/2016 | Klingman, Jr. | E03F 1/008 |
| 12,220,731 | B2 * | 2/2025 | Duncan | B64D 11/02 |

(Continued)

OTHER PUBLICATIONS

International Searching Authority, International Search Report and Written Opinion issued in corresponding PCT Application No. PCT/US2021/040862, mailed Dec. 6, 2021, 12 pages.

(Continued)

*Primary Examiner* — Christopher M Afful
(74) *Attorney, Agent, or Firm* — Wood Herron & Evans LLP

(57) ABSTRACT

A waste disposal apparatus for servicing a lavatory of an aircraft. The waste disposal apparatus includes an open-top waste receptacle for accidental fallout of a waste debris or a chemical solution from the aircraft. The waste receptacle includes a plurality of sidewalls that are joined to and extend upwardly from a floor. The floor and the plurality of sidewalls together form a bounds of a workspace within an interior of the waste disposal apparatus. The waste disposal apparatus also includes a plurality of hose ports disposed within the plurality of sidewalls of the waste receptacle. The hose ports include a waste hose port configured to facilitate a transport of waste from the aircraft and a rinse/refill hose port configured to facilitate a transport of a chemical solution to the aircraft. A waste disposal system and a method of servicing an aircraft are also provided.

20 Claims, 8 Drawing Sheets

(56) References Cited

U.S. PATENT DOCUMENTS

| | | | |
|---|---|---|---|
| 2004/0050008 | A1 | 3/2004 | Mintie et al. |
| 2017/0246976 | A1 | 8/2017 | Lutzer et al. |

OTHER PUBLICATIONS

International Searching Authority, International Preliminary Report on Patentability issued in corresponding PCT Application No. PCT/US2021/040862, mailed Jan. 10, 2023, 7 pages.

* cited by examiner

WASTE DISPOSAL SYSTEM

CROSS-REFERENCE TO RELATED APPLICATIONS

This application is a continuation of application Ser. No. 18/004,890 (pending), filed Jan. 10, 2023, which is a U.S. national phase filing under 35 USC § 371 of International Application No. PCT/US2021/040862, filed Jul. 8, 2021, which claims priority to, and the benefit of the filing date of, U.S. Provisional Application No. 63/050,289, filed Jul. 10, 2020, the disclosures of each of which are incorporated by reference herein in their entireties.

FIELD OF THE INVENTION

The present invention relates generally to an apparatus and method for assisting in the disposal of waste and chemical debris from an aircraft and replenishment of sanitary chemical solutions to the aircraft during the servicing of an aircraft lavatory.

BACKGROUND OF THE INVENTION

Presently, the removal of human waste and replenishing of lavatory solutions during the routine servicing of an aircraft is a manual operation. A ramp attendant uses a system of hoses, couplings, and storage tanks to drain human waste, including urine and fecal matter, from the aircraft lavatory and to replenish the lavatory with a chemical solution. The chemical solution used to fill the storage tanks of the aircraft lavatory generally includes water, perfumes, chemical, and other ingredients that reduce or mask the smell of the human waste. An example of such a mixture is a sand and silica solution, which helps to present an appearance of cleanliness.

Human waste, whether combined with perfumes or the chemicals used as components of the chemical solution, is a hazardous material. Additionally, the chemical solution itself is a hazardous material. As such, any contact of human waste or chemical solution with human persons, their clothing, or other property should be avoided. However, due to the consequent lack of protection currently used for servicing aircraft lavatories, there exists the potential for the chemical solution and human waste to spill onto the attendant or tarmac during routine servicing of the aircraft. This spillage may also come into contact with other persons in the vicinity of the aircraft lavatory or with property, such as baggage, which may be associated with the aircraft. Additionally, persons and property may come into contact with chemical solution or human waste remaining on an airport tarmac following the servicing of an aircraft. Thus, there are significant risks associated with servicing of an aircraft, not the least which are health hazards, for anyone whose person or property contacts the chemical solution or human waste.

Regarding the method currently used to service an aircraft lavatory, an attendant places a service cart/truck in proximity to an access panel on the aircraft for the aircraft lavatory. The service cart/truck includes storage tanks that waste will be deposited into and chemical solution will be pumped from. The access panel is generally located underneath or on the side of the aircraft. This access panel is usually secured with thumb snaps, which are compressed, allowing the door to open upon release. Following the placement of the service cart/truck, the ramp attendant, wearing latex gloves as a precautionary measure, opens the access panel. Tubing associated with storage tanks of the aircraft lavatory is accessible behind the access panel. Valves are operatively connected to these tubes to affect their opening and closing. The tube and valve system of the aircraft includes a rinse/refill tube having a male flange, a waste tube having a male flange, and a T-handle. By manipulating the T-handle, all waste debris inside the holding tank of the aircraft lavatory is released and thus emptied from the aircraft through the waste tube. This waste flows to the storage tank of the service cart/truck through a waste hose which has been connected to the waste tube of the aircraft. The service cart/truck also includes a rinse/refill hose which connects with the rinse/refill tube of the aircraft. These hoses are used to replenish the aircraft lavatory with chemical solution once the waste has been discharged.

Generally, upon opening the access panel, a stream of chemical solution, which almost always contains human waste, falls out of the drainage pipes in the aircraft. Often, this mixture contacts the hands, face, and clothing of the attendant, the service cart/truck, and the tarmac underneath the aircraft. Depending on the type and design of the aircraft, any such contamination may spread to the cargo and baggage area near the lavatory system. If wind is blowing during servicing of the aircraft, the potential for spreading of hazardous materials increases significantly.

Following the opening of the access panel, a cap closing off the waste tube is opened. Waste drainage or tissue debris is located in the waste tube beyond this cap, as the contents of the lavatory holding tank drain to the lowest point. As in the case of the chemical solution, this waste drainage also falls and may contact the attendant's hands and clothing, unless the ramp attendant dangerously and quickly releases the handle of the waste cap and steps blindly backwards to avoid the drainage. Such motion could result in an accident or injury to the attendant or others. Occasionally, the waste release valve may be inadvertently left open or may open accidentally during travel, and thus the waste therein streams out when the ramp attendant opens the cap of the waste tube. This results in a substantial amount of waste debris falling out of the aircraft and onto the attendant, the service cart/truck, and the tarmac beneath the aircraft.

After the initial flow of waste matter has stopped, the attendant will attach the waste coupling on the waste hose extending from the service cart/truck to the aircraft by rotating the head, thereby locking the coupling in place. After locking the waste coupling in place, the attendant releases the waste stored in the lavatory holding tank in order that it may flow into the waste hose of the now attached waste disposal system. During this flow, human waste and chemical solution may leak from the junction of the couplings, the waste hose, and waste tube. Any such leakage causes the exterior of the tubing and coupling to become contaminated with human waste or chemical solution. Additionally, this waste hose lies on top of the service cart/truck, further exposing the entire service cart/truck to waste debris. Additionally, any attendant in proximity to the drainage process may come into contact with this waste leakage. The waste debris may further fall to the airport tarmac.

Once the waste has flowed into the waste hose, the waste hose must be snaked or angled so the waste will be deposited into the storage tanks of the service cart/truck. As the couplings are used over time, the bearings and rings start to wear. As a result, any rotation of the head causes leakage of waste debris. Also, the waste hose generally includes metal wire woven inside. This can result in holes and tears in the waste hose leading to the service cart/truck, causing drips and runs as the waste is deposited into the service cart/truck.

After the waste is deposited into the service cart/truck, the ramp attendant disconnects the waste coupling, steps back quickly, and returns the waste hose and coupling to the service cart/truck. The attendant waits until the remaining drips of waste have stopped and then locks the waste cap back in place. This leakage may also result in the contamination of persons and property.

After all waste has been drained from the aircraft, the ramp attendant connects the coupling of the rinse/refill hose to the rinse/refill flange of the aircraft and locks it into place in a manner similar to the waste coupling. The attendant walks to the service cart/truck and turns on a switch on a pump to refill the lavatory with the chemical solution. The amount of chemical solution used will vary by aircraft, but it can be as much as 500 gallons. Following refill, the attendant stops the pump and unlocks the fill coupling from the aircraft, and, as in the case of the waste drainage, blindly and in a backward motion tries to escape being hit with the refill chemical solution as it drains back out of the aircraft. After the backwash flow of the chemical solution is emptied onto the tarmac with the attendant hazards of contacting persons or property, the agent places the rinse/refill hose back onto the service cart/truck and locks the cap back onto the rinse/refill tube of the aircraft.

The ramp attendant finally closes the lavatory access panel, removes his latex gloves, and pulls away to the next aircraft. As the ramp attendant pulls away, there is often residual human waste and chemical solution left behind on the tarmac and on the service cart/truck, as well as on the clothes of the attendant. Waste debris may also remain on the cargo and baggage near the aircraft, and on other persons such as nearby airport personnel. Any waste or chemical solution on the tarmac may remain until it rains or the material evaporates.

As can be seen from the above description, the current method of servicing aircraft lavatory systems results in the deleterious spread of human waste around the world at airports, such as urine and fecal material, along with chemical solution to humans and property. Contact with such hazardous material could potentially have several harmful effects. Thus, it would be desirable to have a system for servicing aircraft lavatories with minimal splashing of human waste onto ramp attendants, property, and the tarmac of airports. Additionally, it would be desirable to have a system which minimizes contact of chemical solution with attendants, property, and the tarmac. Finally, it would be desirable to have a system which would not subject the environment to risks of hazardous materials.

SUMMARY OF THE INVENTION

In accordance with exemplary embodiments of the invention, a waste disposal apparatus, a waste disposal system, and a method for servicing a lavatory of an aircraft are described. The apparatus, system, and method for personal protection while servicing an aircraft lavatory of the present invention address the problems and the drawbacks of current apparatuses, systems, and methods of servicing aircraft lavatories as developed in the background of the invention. Certain exemplary aspects of the invention are set forth below. It should be understood that these aspects are presented merely to provide the reader with a brief summary of certain forms the invention might take and that these aspects are not intended to limit the scope of the invention.

In one aspect of the disclosure, a waste disposal apparatus for servicing a lavatory of an aircraft is provided. The waste disposal apparatus includes an open-top waste receptacle for accidental fallout of a waste debris or a chemical solution from the aircraft. The waste receptacle includes a plurality of sidewalls that are joined to and extend upwardly from a floor. The plurality of sidewalls are further joined to each other at their side edges. The floor and the plurality of sidewalls together form a bounds of a workspace within an interior of the waste disposal apparatus. The waste disposal apparatus further includes a plurality of hose ports disposed within the plurality of sidewalls of the waste receptacle. The plurality of hose ports include a waste hose port configured to facilitate a transport of waste from the aircraft by allowing a waste hose to extend from an exterior of the waste disposal apparatus through to the interior of the waste disposal apparatus. The waste hose is not connected to the waste hose port and is free to move within the waste hose port. The plurality of hose ports further include a rinse/refill hose port configured to facilitate a transport of a chemical solution to the aircraft by allowing a rinse/refill hose to extend from the exterior of the waste disposal apparatus through to the interior of the waste disposal apparatus. The rinse/refill hose is not connected to the rinse/refill hose port and is free to move within the rinse/refill hose port.

In one embodiment, the plurality of sidewalls may include a tall sidewall that forms a barrier between a user and the interior of the waste receptacle. Further, the waste disposal apparatus may include an orifice disposed within the tall sidewall. The orifice may be configured to allow the user to extend their hands from the exterior of the waste disposal apparatus into the workspace of the interior of the waste disposal apparatus. The waste disposal apparatus may further include an interface insert disposed within the orifice. The interface insert may be configured to allow the user to customize the orifice. The interface insert may include a plurality of vertically oriented vinyl strips covering the orifice. The vinyl strips may be configured to offer a penetrable barrier between the interior and exterior of the waste disposal apparatus. Alternatively, the interface insert may include two smaller orifices. Each of the two smaller orifices may include a glove member operatively connected at a cuff to the orifice. The glove member may extend from the interface insert into the workspace of the interior of the waste disposal apparatus.

In one embodiment, the waste disposal apparatus may include a face shield disposed atop and operatively connected to a sidewall of the plurality of sidewalls. A substantial portion of the face shield may be substantially transparent to allow viewing of the workspace of the interior of the waste disposal apparatus from the exterior of the waste disposal apparatus. Further, the face shield may be configured to pivot between a substantially vertical position and a substantially horizontal position by foldable devices that include a locking and releasing feature as to be foldable for purposes of storage between uses. Alternatively or additionally, the face shield may include a video display system configured to permit a user to view the workspace of the interior of the waste disposal apparatus.

In one embodiment, the floor of the waste receptacle may be sloped to form a spill trap. The floor of the waste receptacle may be sloped towards a drain port located in the floor and the spill trap may be configured to catch accidental fallout of the waste debris or the chemical solution and direct the waste debris or the chemical solution out of the waste receptacle. Further, in an embodiment, the plurality of hose ports may further include an electric wire port configured to facilitate the passing through of a wiring from the exterior of the waste disposal apparatus through to the interior of the waste disposal apparatus. Further, in an embodiment, the waste disposal apparatus may be mounted to a stand. The stand may bear a weight of the waste disposal apparatus and be configured to facilitate the use of the waste disposal apparatus with the aircraft. Further, the stand may be operatively connected to a service cart/truck to enhance a mobility and operability of the waste disposal apparatus.

In another aspect of the disclosure, a waste disposal system for servicing a lavatory of an aircraft is provided. The waste disposal system includes a waste disposal apparatus. The waste disposal apparatus includes an open-top waste receptacle for accidental fallout of a waste debris or a chemical solution from the aircraft. The waste receptacle includes a plurality of sidewalls that are joined to and extend upwardly from a floor. The plurality of sidewalls are further joined to each other at their side edges. The floor and the plurality of sidewalls together form a bounds of a workspace within an interior of the waste disposal apparatus. The waste disposal system further includes at least one tank releasably fastened to a bottom of the waste disposal apparatus. The tank is configured to expand a storage capability of the waste disposal apparatus. The tank includes a threaded insert configured to facilitate fastening of the tank to the waste disposal apparatus. The threaded insert is further configured to facilitate fastening of one or more additional tanks to the at least one tank.

In one embodiment, the at least one tank may be configured to expand a volume of the waste receptacle for accidental fallout of the waste debris or the chemical solution from the aircraft. Further, the at least one tank may be configured to receive waste from the aircraft by a waste hose. The waste hose may extend from the aircraft to the at least one tank. Further, the at least one tank may be configured to store the chemical solution. The chemical solution may be transferred to the aircraft by a rinse/refill hose extending from the at least one tank to the aircraft.

In one embodiment, the waste disposal system may further include a plurality of hose ports disposed within the plurality of sidewalls of the waste receptacle. The plurality of hose ports may include a waste hose port. The waste hose port may be configured to facilitate a transport of waste from the aircraft by allowing a waste hose to extend from an exterior of the waste disposal apparatus through to the interior of the waste disposal apparatus. The waste hose may not be connected to the waste hose port and may be free to move within the waste hose port. The plurality of hose ports may also include a rinse/refill hose port. The rinse/refill hose port may be configured to facilitate a transport of the chemical solution to the aircraft by allowing a rinse/refill hose to extend from the exterior of the waste disposal apparatus through to the interior of the waste disposal apparatus. The rinse/refill hose may not be connected to the rinse/refill hose port and may be free to move within the rinse/refill hose port. Further, the waste disposal system may be mounted to a stand. The stand may bear a weight of the waste disposal system and may also be configured to facilitate the use of the waste disposal system with the aircraft. Further, the stand may be operatively connected to a service cart/truck to enhance a mobility and operability of the waste disposal system.

In another aspect of the disclosure, a method of servicing a lavatory of an aircraft is provided. The method includes providing a waste disposal apparatus. The waste disposal apparatus includes an open-top waste receptacle. The waste receptacle includes a plurality of sidewalls that are joined to and extend upwardly from a floor. The plurality of sidewalls are further joined to each other at their side edges. The floor and the plurality of sidewalls together form a bounds of a workspace within an interior of the waste disposal apparatus. The waste disposal apparatus further includes a plurality of hose ports disposed within the plurality of sidewalls of the waste receptacle. The plurality of hose ports include a waste hose port configured to facilitate a transport of waste from the aircraft and a rinse/refill hose port configured to facilitate a transport of a chemical solution to the aircraft. The method further includes extending the waste hose from an exterior of the waste disposal apparatus through the waste hose port and into the interior of the waste disposal apparatus. The waste hose is not connected to the waste hose port and is free to move within the waste hose port. The method further includes extending the rinse/refill hose from the exterior of the waste disposal apparatus through the rinse/refill hose port to the interior of the waste disposal apparatus. The rinse/refill hose is not connected to the rinse/refill hose port and is free to move within the rinse/refill hose port. The method further includes catching accidental fallout of the waste debris or the chemical solution from the aircraft during the servicing in the waste receptacle of the waste disposal apparatus.

In one embodiment, the plurality of sidewalls of the waste disposal apparatus may include a tall sidewall that forms a barrier between a user and the interior of the waste receptacle. Further, the method of servicing a lavatory of an aircraft may further include releasably fastening at least one tank to a bottom of the waste disposal apparatus. The tank may be configured to expand a storage capability of the waste disposal apparatus. The tank may include a threaded insert configured to facilitate fastening of the tank to the waste disposal apparatus and further configured to facilitate fastening of one or more additional tanks to the at least one tank. The method may further include mounting the waste disposal apparatus to a stand. The stand may bear a weight of the waste disposal apparatus and may be configured to facilitate the use of the waste disposal apparatus with the aircraft. The method may further include operatively connecting the stand to a service cart/truck to enhance a mobility and operability of the waste disposal apparatus.

It will be understood that various embodiments and aspects described above can be combined in any combination or sub-combination without departing from the scope of this disclosure.

BRIEF DESCRIPTION OF THE DRAWINGS

Various additional features and advantages of the invention will become apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION OF THE INVENTION

Figure 1:
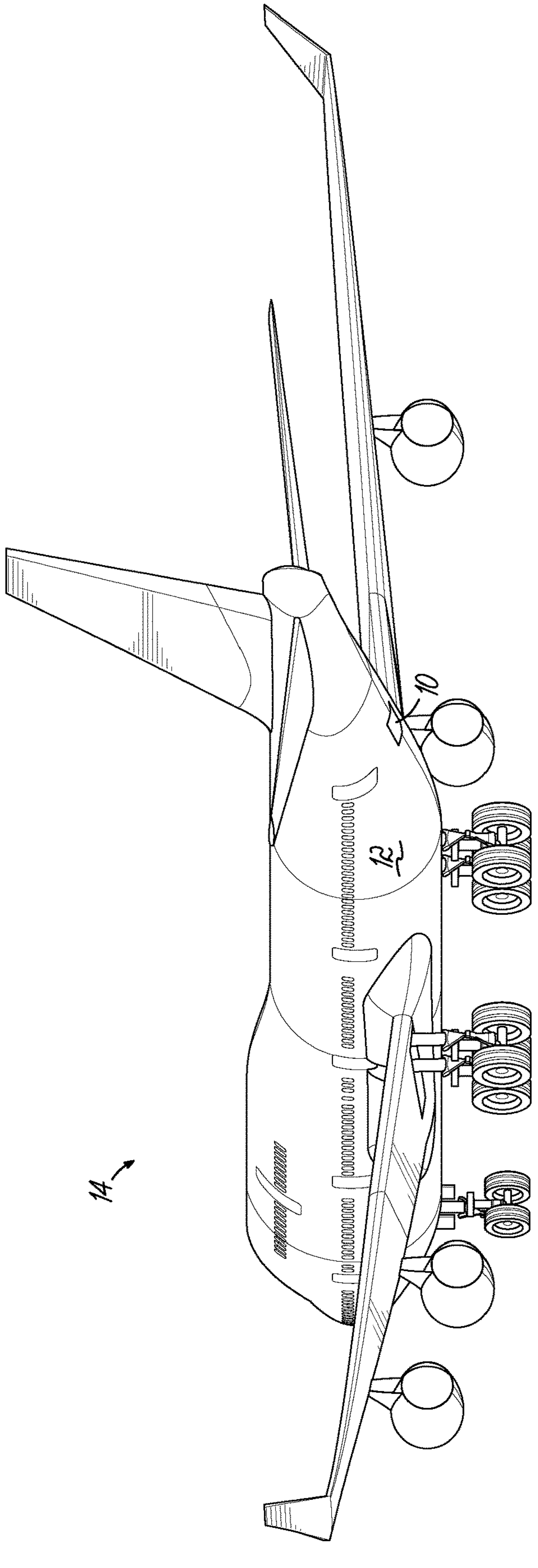
FIG. 1 is an environmental view of the access panel of a lavatory tank located on the fuselage of an aircraft.

With reference to FIGS. 1 through 7E, embodiments of the waste disposal apparatus 30 are shown in detail. The waste disposal apparatus 30 of the present invention provides a containment mechanism (e.g., the waste receptacle 32) for rerouting human waste, such as fecal debris and the like, and chemical solution from the lavatory storage tank of an aircraft 14 or other mode of transportation (e.g., bus, train, etc.), thereby providing personal protection while preventing contact of waste and chemical solution with persons or property.

Advantageously, the waste disposal apparatus 30 of the present invention avoids the problems of traditional waste disposal systems, as described in the background of the invention. With previous waste disposal systems, if the volume of waste discharged from the aircraft exceeded the volume that the system was capable of handling (e.g., in the case of a large aircraft), the systems would likely overflow. Waste overflowing from the waste disposal system could lead to the ramp attendant, the aircraft ramp, the tarmac, customer baggage, and other property on the ramp becoming contaminated with human waste and chemical solutions used to deodorize and sanitize aircraft lavatories. Thus, in all scenarios except where the previous waste disposal systems are used for small aircrafts, the previous iterations of waste disposal systems are prone to exacerbate the problem of exposure to waste instead of helping to mitigate or minimize the problem.

Further, the waste disposal apparatus 30 of the present invention provides a multitude of benefits over traditional waste disposal systems, as will be appreciated by one of ordinary skill in the art. First, the various hoses associated with servicing an aircraft lavatory are passed through the waste disposal apparatus 30 of the present invention via ports 46, 48, 50 instead of the hoses being secured to the apparatus 30, as with previous waste disposal systems. Providing pass through ports 46, 48, 50 offers the benefit of universality of the waste disposal apparatus 30 of the present invention. Second, the waste disposal apparatus 30 features a modular interface insert 34 that can be changed depending on the needs or preferences of the individual user. Third, a portion of the waste disposal apparatus 30 is foldable to facilitate an efficient use of space when storing the waste disposal apparatus 30 between uses. Fourth, the waste disposal apparatus 30 optionally includes dual-purpose, universal add-on tanks 54 which can be secured to the bottom of the waste disposal apparatus 30. The add-on tanks 54 can be used as additional repositories for waste caught in the waste receptacle 32 of the waste disposal apparatus 30. Further, the add-on tanks 54 can be filled with chemical solution and used as a source of chemical solution when servicing the aircraft lavatory. A user can attach any number of add-on tanks 54 to the bottom of the waste disposal apparatus 30. Other advantages and technical effects of the embodiments of this invention will become evident to one skilled in the art from the following description.

Beginning with reference to FIG. 1, an access panel 10 for servicing a lavatory is depicted on the fuselage 12 of an aircraft 14. This access panel 10 may be located underneath the fuselage 12 or on the side of the fuselage 12.

Figure 2A:
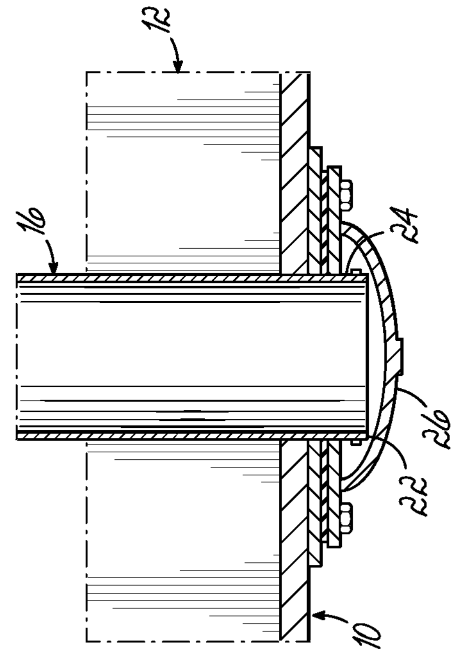
FIG. 2A is a cross-sectional view of the waste tube of an aircraft lavatory taken along line 2A-2A of FIG. 2.
Figure 2:
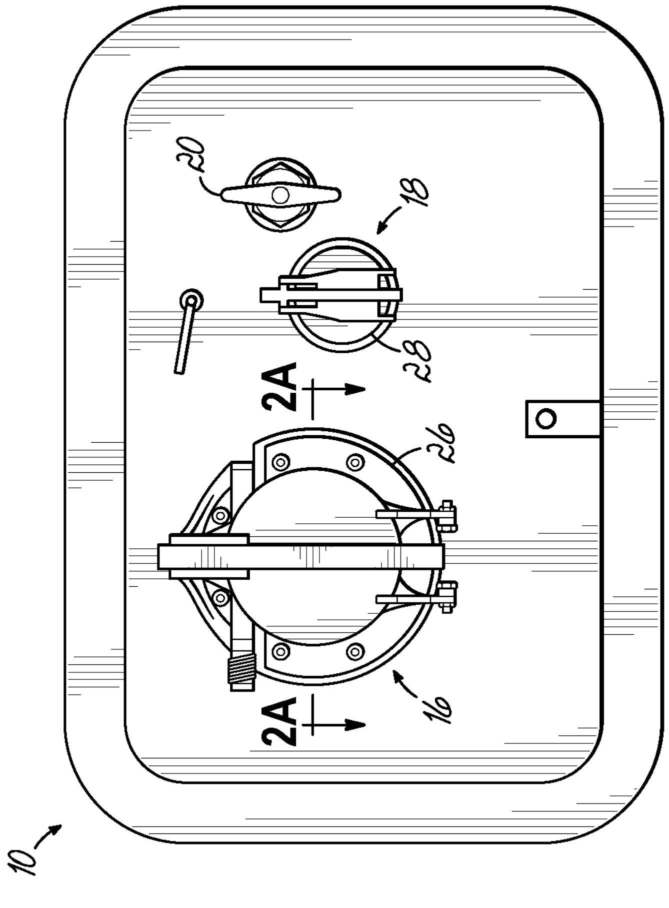
FIG. 2 is a perspective view of the tubing system of an aircraft lavatory.

Referring now to FIG. 2, the system of tubes 16, 18 and valves used in lavatory service is depicted. The tubes 16, 18 are exposed upon opening the access panel 10. These include a waste tube 16, a rinse/refill tube 18, and a T-handle 20. The waste tube 16 includes a distal end and a proximal end 22. The distal end is operatively connected to the waste holding tank of the aircraft lavatory. The proximal end 22 is disposed in the vicinity of the access panel 10 and includes a male flange 24 at the terminus of its proximal end 22. This flange 24 and the opening of the proximal end 22 of the waste tube 16 are covered by a waste tube cap 26 to close off the opening of the waste tube 16.

Like the waste tube 16, the rinse/refill tube 18 includes a distal end and a proximal end. The distal end is operatively connected to the chemical solution holding tank of the aircraft lavatory. The proximal end is disposed in the vicinity of the access panel 10 and includes a male flange at the terminus of its proximal end. This flange and the opening of the proximal end of the rinse/refill tube 18 are covered by a rinse/refill tube cap 28 to close off the tube 18 opening. The T-handle 20 is operatively connected to a valve of the waste tube 16 and holding tank. When manipulated, the T-handle 20 causes the valve to open, thereby allowing the discharge of stored waste from the holding tank of the lavatory and out through the waste tube 16.

Figure 3:
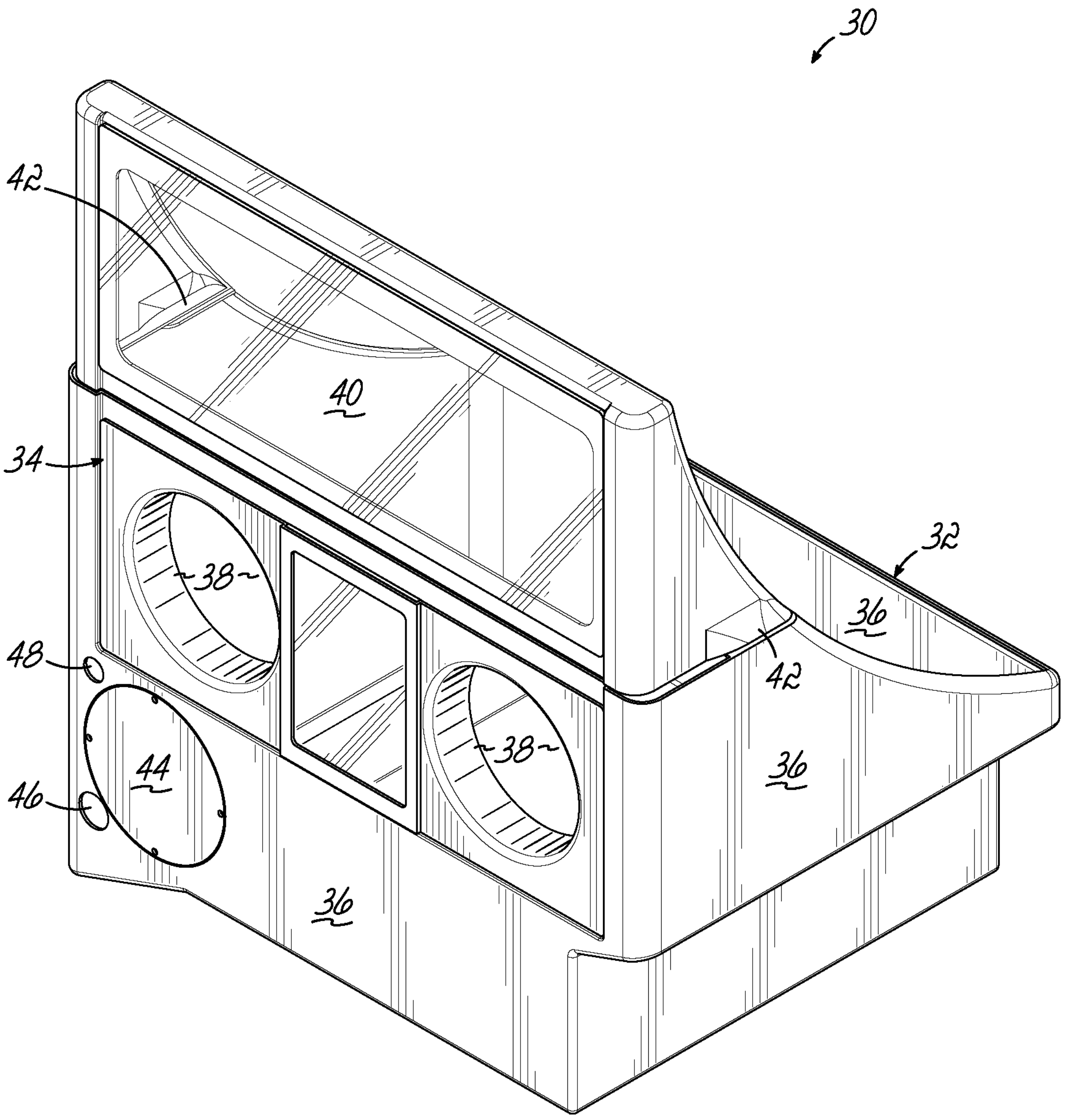
FIG. 3 is a perspective view of an embodiment of the waste disposal apparatus of the present invention.

Referring now to FIG. 3, the waste disposal apparatus 30 is sized to match the contour of the fuselage of a particular aircraft 14. Further, the size of the waste disposal apparatus 30 can be altered to fit other aircrafts 14 or other modes of transportation (e.g., buses, trains, etc.). The waste disposal apparatus 30 includes a waste receptacle 32 which is substantially impermeable to human waste and chemical solution. The waste receptacle 32, in various embodiments, may be formed of a rigid material such as high-density polyethylene ("HDPE"). Further, the waste disposal apparatus 30 includes an open top adapted to be placed in proximity to an access panel 10 of the tanks of an aircraft lavatory for the servicing thereof. In additional, the waste disposal apparatus 30 includes a small top panel section to allow for the attachment of interior lighting as well as roll over splash protection.

Additionally, the waste disposal apparatus 30 of the present invention includes an interface insert 34 disposed within a sidewall 36 of the waste disposal apparatus 30. In an embodiment, the interface insert 34 includes orifices 38 such that a user can extend their hands and arms through the orifices 38 and into the workspace defined by the interior of waste disposal apparatus 30.

Still referring to FIG. 3, the waste disposal apparatus 30 further includes a face shield 40. In an embodiment, the face shield 40 of the waste disposal apparatus 30 is removable and replaceable. In embodiments of the present invention, the face shield 40 may be operatively connected to the sidewall 36 of the waste disposal apparatus 30 by hooks, snaps, fasteners, or any other method known to those skilled in the art. A major portion of the face shield 40 is substantially transparent so that a user having his or her hands inserted through the interface insert 34 can view the workspace of the waste disposal apparatus 30 and the area of the access panel 10 being worked upon from outside the waste disposal apparatus 30. The face shield 40 protects the face of the user while using the waste disposal apparatus 30. In an embodiment, the face shield 40 is formed of a transparent, flexible sheet plastic which is substantially impermeable to waste debris, such as fecal material and chemical solution. However, any flexible or rigid material which is substantially impermeable to human waste debris and chemical solution may be used. In an alternative embodiment, the face shield 40 can be replaced with a video display system which permits a user to view the interior of the waste disposal apparatus 30 via a camera disposed within the interior of the waste disposal apparatus 30. Further, the video display system can be used to record lavatory servicing operations for future study or training purposes.

The present invention also includes a waste hose port 44 disposed within the sidewall 36 of the of waste receptacle 32, for facilitating the transport of waste. The waste hose extends from the waste tube 16 of the aircraft 14, through the interior of the waste disposal apparatus 30, through the waste hose port 44 of the sidewall 36 of the waste disposal apparatus 30 and is operatively connected to a waste storage tank on a service cart/truck. The waste hose includes a coupling which is compatible with a flange 24 on a waste tube 16 located behind the access panel 10 of the aircraft 14.

In an embodiment, the waste hose is formed of a flexible material (e.g., plastic) such that a user may easily manipulate the waste hose within the waste disposal apparatus 30 to make a connection with the waste tube 16. The flexibility of the waste hose allows for its positioning to enhance the efficiency of deposition of waste material into the waste storage tank. In an embodiment, the waste hose port 44 is sized to be substantially the same size as or larger than the circumference of the waste hose. The proximal end of the waste hose includes a female coupling which attaches to a corresponding male flange 24 on the proximal end 22 of the waste tube 16.

Following this connection, the waste hose is used to transport human waste debris and other debris from the aircraft 14 to a waste storage tank on the service cart/truck. In an embodiment, the waste hose is generally of a round shape having a diameter in the range of approximately 4 to 4½ inches. The length of the waste hose extends throughout the waste disposal apparatus 30 and further extends to the waste tank of the service cart/truck. The length of the waste hose will vary depending on the style of service cart/truck used, and therefore, its potential distance from the aircraft 14.

Still referring to FIG. 3, the waste disposal apparatus 30 of the present invention may also include a rinse/refill hose port 46 disposed within the sidewall 36 of the of waste disposal apparatus 30. This rinse/refill hose port 46 allows for a rinse/refill hose to be extended through the rinse/refill hose port 46 and into the workspace defined by the enclosure of the interior of waste receptacle 32. In an embodiment, the rinse/refill hose is formed from a flexible material, in order that a user may easily manipulate the rinse/refill hose for connection to the rinse/refill tube 18. In an embodiment, the rinse/refill hose port 46 is sized to match or slightly exceed the circumference of the rinse/refill line.

The rinse/refill hose extends from the rinse/refill tube 18 of the aircraft 14, through the rinse/refill hose port 46 (or, alternatively, through the secondary rinse/refill hose port below the raised floor panel 51 in the floor of the waste receptacle 32, as described below in reference to FIG. 5) of the waste disposal apparatus 30 and is operatively connected to a chemical solution storage tank on a service cart/truck. In an embodiment, the rinse/refill hose further includes a refill line switch operatively connected to a pump used to transport chemical solutions, such as chemical solution, through the rinse/refill hose. The rinse/refill hose includes a coupling that is compatible with the flange of the rinse/refill tube 18 located behind the access panel 10 of the aircraft 14.

The proximal end of the rinse/refill hose includes a female coupling which attaches to a corresponding male flange on the proximal end of the rinse/refill tube 18. Following the connection, the rinse/refill hose is used to transport chemical solution from the holding tanks of the service cart/truck to the aircraft 14. In an embodiment, the rinse/refill hose is generally of a round shape having a diameter in the range of approximately 1 inch to 1½ inches. The length of the rinse/refill hose extends throughout the waste disposal apparatus 30 and extends to the holding tank of the service cart/truck. The length of the rinse/refill hose will vary depending on the style of the service cart/truck used and, therefore, its potential distance from the aircraft 14.

Additionally, in an embodiment, the rinse/refill hose also includes a switch or valve which may be operatively connected to a pump in order to activate the pump to discharge chemical solution from the storage tank on the cart/truck through the rinse/refill hose and into the lavatory of the aircraft 14 following the removal of human waste. Upon activation of the switch or valve, the lavatory of the aircraft 14 is refilled with chemical solution. In an embodiment, the switch is an automatic switch. However, it will be appreciated that in alternate embodiments of the invention, the switch may be a manual switch.

The switch may be located on the interior or exterior of the waste disposal apparatus 30. The switch may be in the form of a button, toggle, marine-type, or other waterproof switch. Alternatively, the switch may be located on a foot pedal easily accessible to the user during refilling of aircraft storage tanks with chemical solution. In yet another alternative embodiment, the switch may be operatively connected to the interior of the waste disposal apparatus 30 and have a wire, such as an electrical wire, adapted to connect with a second wire extending from the pump. The connection between the pump wire and the switch wire may occur at the waste disposal apparatus 30 interface in order to operatively connect the switch to the pump. The location of the switch inside the waste disposal apparatus 30 prevents the user from having to remove his or her hands from the workspace within the waste disposal apparatus 30 to activate a switch on the service cart/truck.

The waste disposal apparatus 30 of the present invention may also include an electric wire port 48 disposed within the sidewall 36 of the of waste receptacle 32. This electric wire port 48 allows for electric wires to be extended through the electric wire port 48 and into the workspace defined by the enclosure of the interior of waste receptacle 32. Electric wires may be used for lights, pumps, or electronic switches. For example, the interior of the waste receptacle 32 may feature lights (e.g., LED lights or strips) to illuminate the interior of the waste receptacle 32. Furthermore, the waste disposal apparatus 30 may feature aircraft positioning lights, guide lights, proximity guides, or positioning sensor to be used as aids to guide the waste disposal apparatus 30 into a correct position by the access panel 10. Such features may be powered by electric wires that pass through the electric wire port 48. The electric wires may be supplied by a service cart/truck. Further, the waste disposal apparatus 30 may also include stowing locations within or on the sidewalls 36 or the floor of the waste receptacle 32. The stowing locations can be used to stow couplings used for the waste hose and rinse/refill hose.

Figure 4:
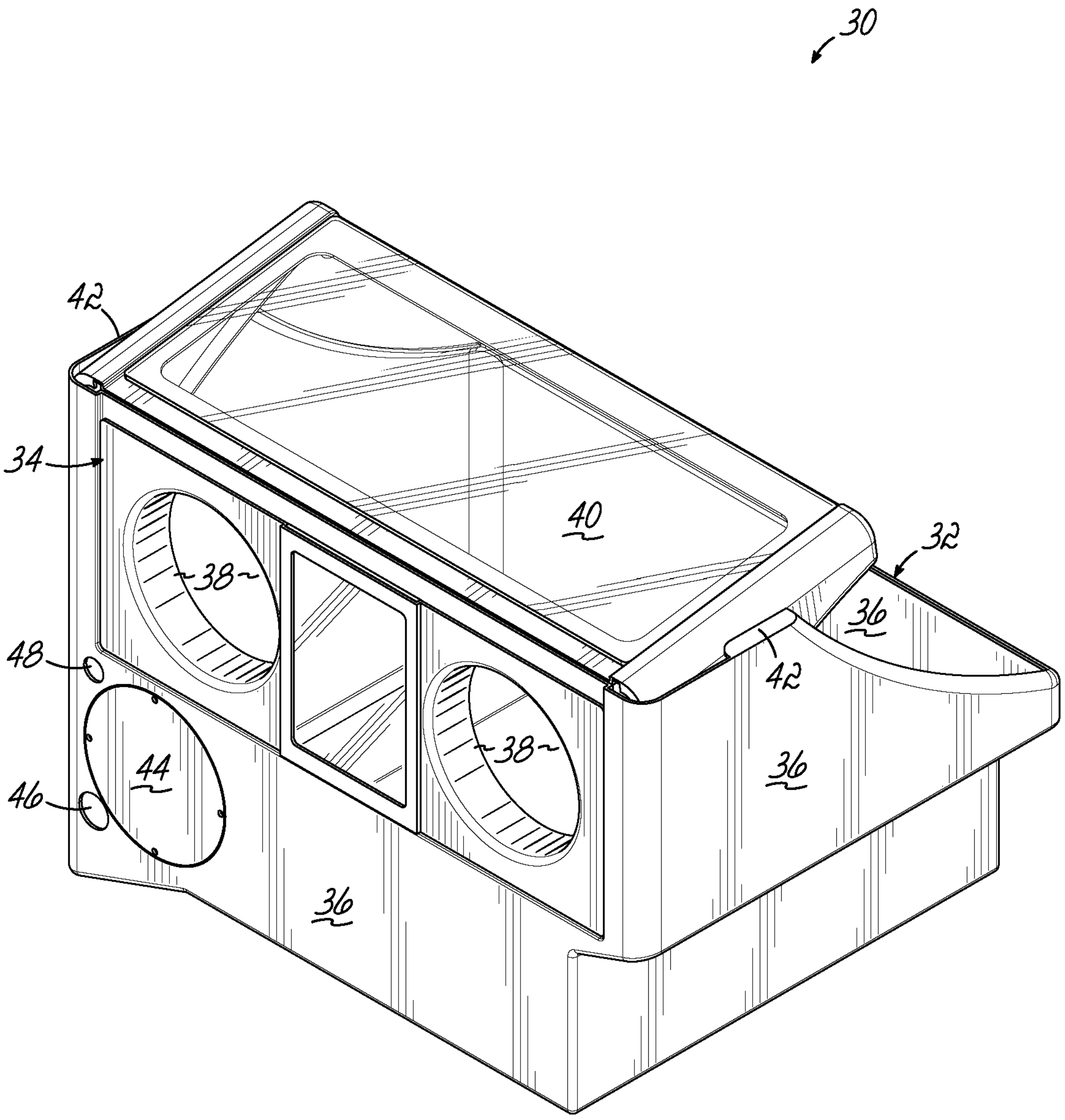
FIG. 4 is a perspective view of the embodiment of the waste disposal apparatus of FIG. 3.

Referring now to FIG. 4, In a further embodiment the face shield 40 of the waste disposal apparatus 30 is configured to be foldable via folding devices 42. The folding devices 42 incorporate a locking and releasing feature located on opposing sides of the waste disposal apparatus 30 and permit the face shield 40 to pivot into a substantially horizontal position so that the waste disposal apparatus 30 occupies less space when stored between uses. The locking and releasing features may be spring loaded hinges or continuous hinges.

Figure 5:
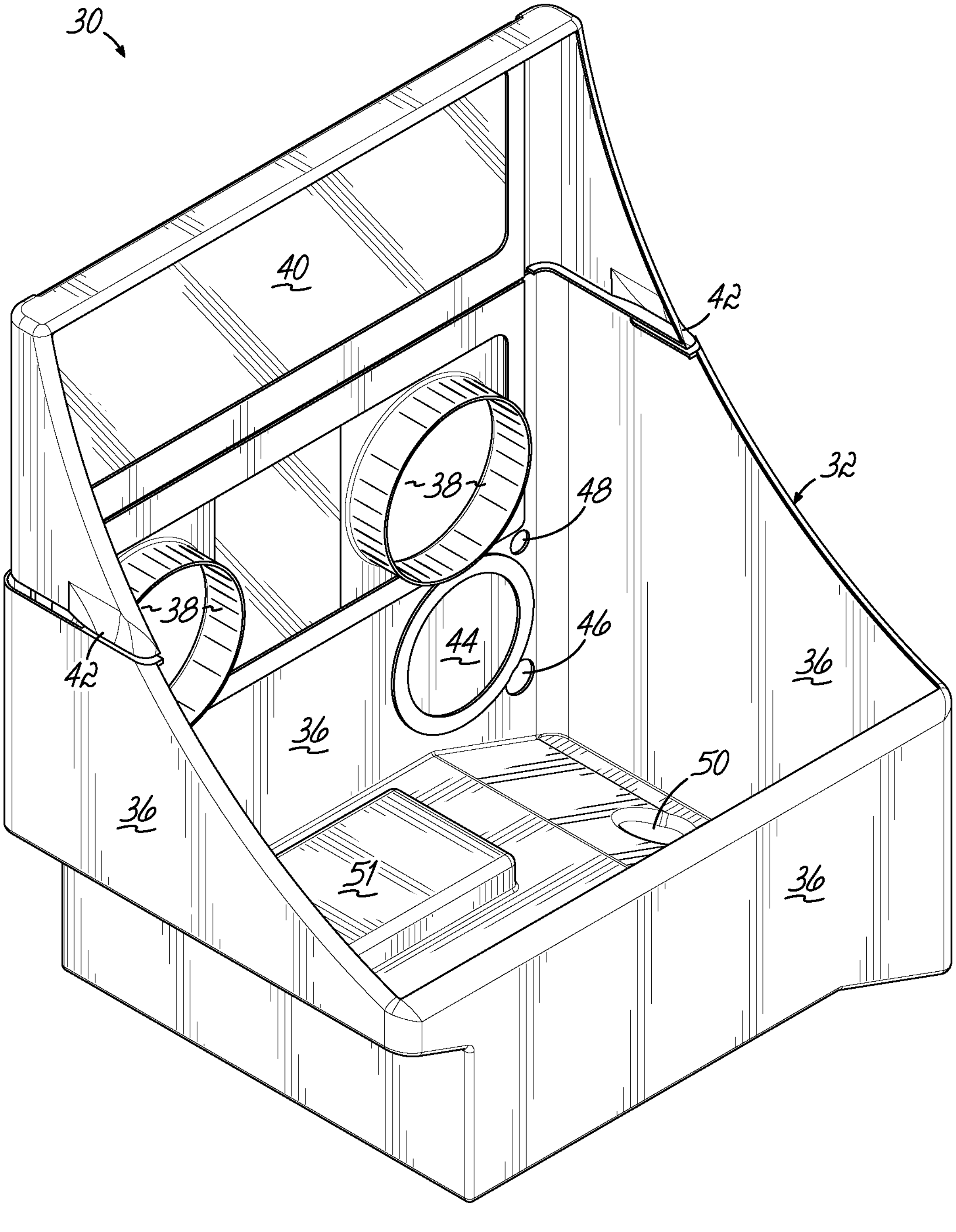
FIG. 5 is a rear perspective view of the embodiment of the waste disposal apparatus of FIG. 3.

Referring now to FIG. 5, the floor of the waste receptacle 32 is disposed opposite the open top and forms a spill trap to which any waste material or chemical solution within the waste receptacle 32 ultimately drains through the drain port 50 due to the sloped floor of the waste receptacle 32 and the force of gravity. The waste receptacle 32 traps waste material and chemical solution which does not flow directly into the waste hose and allows that waste material to drain through the drain port 50 to subsequently be deposited in the waste storage tank of the service cart/truck. Further, the floor of the waste receptacle 32 features a secondary waste hose port located below the raised floor panel 51. The secondary waste hose port has two primary functions. First, the secondary waste hose port is used when an optional tank 54 is attached to the bottom of the waste disposal apparatus 30 and used as a repository for waste. Second, the secondary waste hose port can be used in conjunction with a mechanical coupling to allow a bottom access option for extremely high-volume aircraft lavatories, while still providing a waste receptacle 32 for accidental fallout waste debris. Even further, the floor of the waste receptacle 32 features a secondary rinse/refill hose port located below the raised floor panel 51 for certain end user applications and assembly formats.

Figure 6:
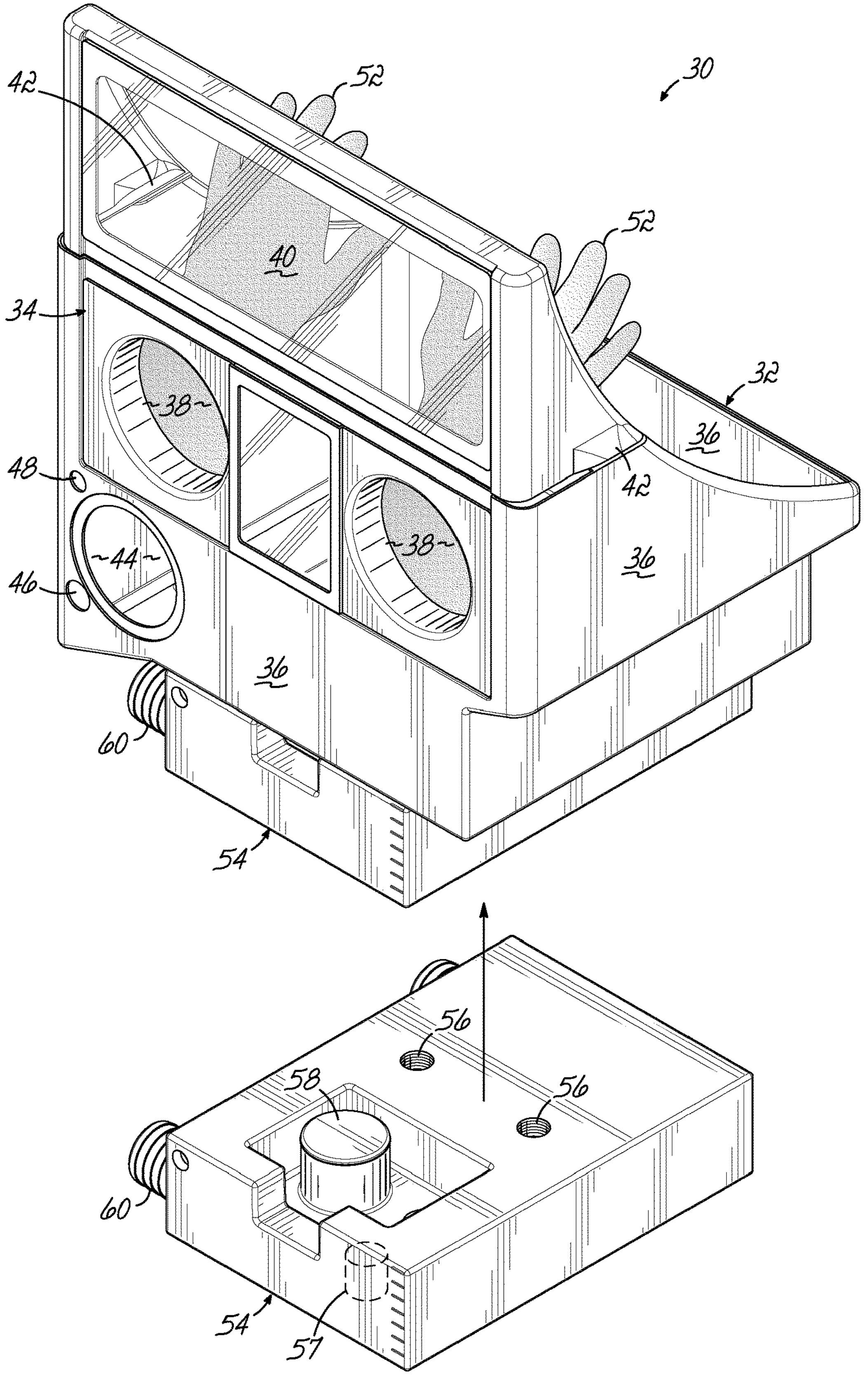
FIG. 6 is an additional perspective view of the embodiment of the waste disposal apparatus of FIG. 3.
Figure 7D:
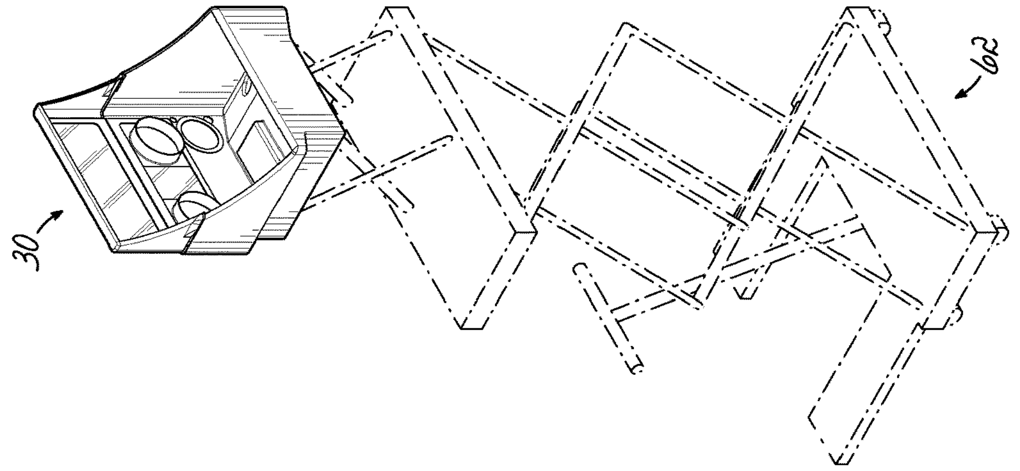
FIGS. 7A-7E are perspective views of a waste disposal apparatus in accordance with principles of the present invention in combination with various stands.
Figure 7C:
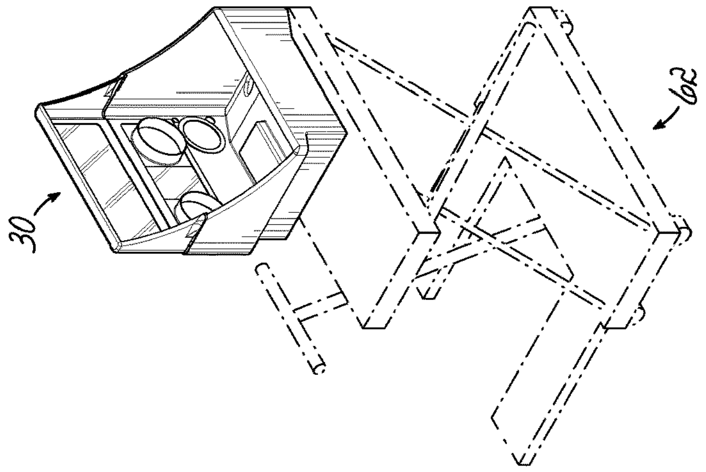
Figure 7B:
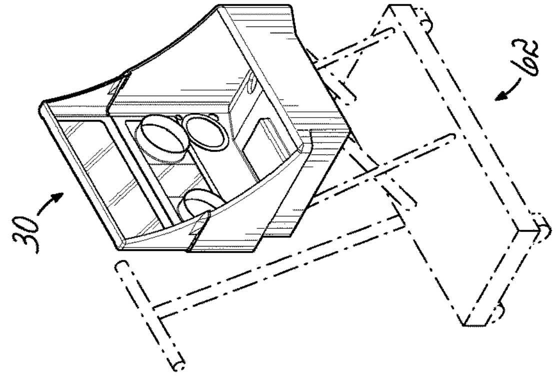
Figure 7A:
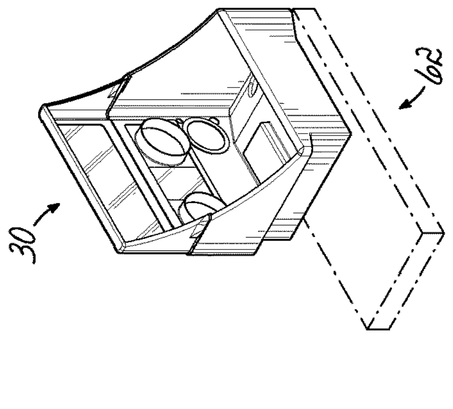
Figure 7E:
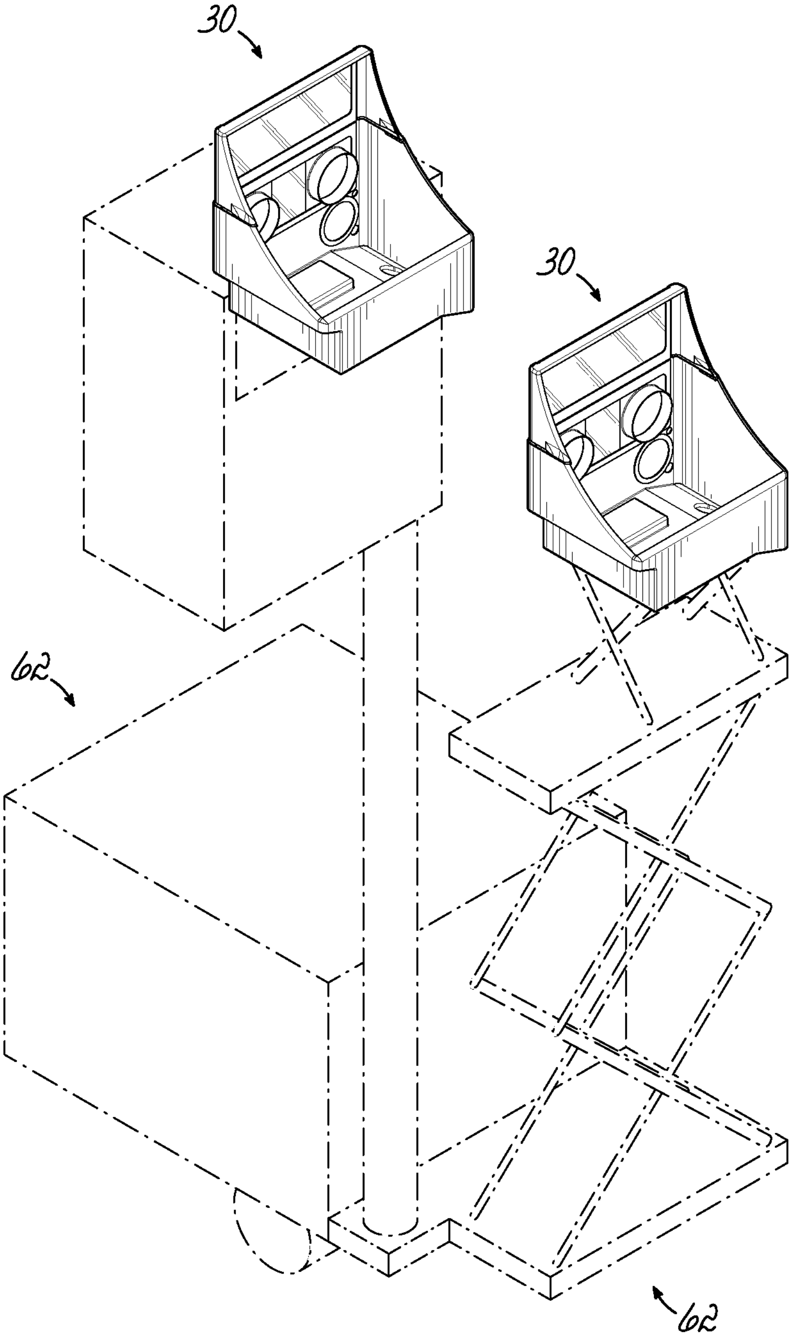

Referring now to FIG. 6, in an embodiment, glove members 52 are provided in the form of flexible gloves attached at their cuffs to orifices 38 in the interface insert 34 of the sidewall 36 of the waste disposal apparatus 30. A ramp attendant places his or her hands in the glove members 52 attached to the waste disposal apparatus 30. The glove members 52 are positioned to accommodate both hands of a user in a comfortable position for working on the area of the lavatory beyond the access panel 10 which is isolated by the waste disposal apparatus 30. In an embodiment of the invention, the material of the glove members 52 is a thin, flexible plastic, although it should be apparent that other conventional glove materials substantially impermeable to human waste debris and chemical solution can be used. Each glove member 52 is attached to its respective orifice 38 by means of clamps, heat, sewing, or snap rings. A glove member 52 allows a user to touch the connection couplings inside the workspace of the waste disposal apparatus 30 while maintaining a clean operation. In an embodiment of the present invention, the glove members 52 are removable and replaceable.

In an alternative embodiment, the interface insert 34 does not feature orifices 38 and glove members 52, but instead features a permeable opening. For example, the opening could be covered by a series of vertically oriented vinyl strips. The vinyl strips may be transparent. The series of vertically oriented vinyl strips offer a barrier between the inside and outside of the waste disposal apparatus 30 that is easily penetrable by a user but prevents waste debris from exiting through the sidewall 36 of the waste disposal apparatus 30. Further, the vinyl strips will provide additional splash protection. A ramp attendant gloves his or her hands before inserting his or her hands through the vinyl strips of the interface insert 34. In a further embodiment, the waste disposal apparatus 30 can be used without an interface insert 34 (e.g., the glove members 52 or the permeable opening covered by vinyl strips). Depending on user preference, the waste disposal apparatus 30 may not require an interface insert 34.

In use, a ramp attendant places his or her hands through the interface insert 34. The ramp attendant then positions the open top of the waste disposal apparatus 30 against the aircraft 14 so as to surround the exposed waste tube 16, the rinse/refill tube 18, and T-handle 20. The attendant then opens the waste tube cap 26 thereby allowing all waste debris to fall into the waste receptacle 32 trap created by the positioning of the waste disposal apparatus 30. The attendant then couples the waste hose to the waste tube 16 by placing the female coupling of the waste hose over the male flange 24 of the waste tube 16 and rotating the coupling to lock the waste hose and waste tube 16 together. Following this coupling, the attendant then pulls the T-handle 20 so that waste will drain through the waste hose and into the waste storage tank of the service cart/truck. The waste debris which has fallen into the waste receptacle 32 will proceed to the lowest point of the floor of the waste receptacle 32 and through the drain port 50 and subsequently to the waste tank located on the service cart/truck.

Still referring to FIG. 6, in an embodiment the waste disposal apparatus 30 features at least one tank 54 attached to the bottom of the apparatus 30. The at least one tank 54 is attached to the bottom of the apparatus 30 with bolts through the threaded inserts 56 on the tank 54. One skilled in the art will appreciate that a tank 54 can be attached to the apparatus 30 via the threaded inserts 56 by any suitable mechanical fasteners such as hooks, snaps, or any other method known to those skilled in the art. In an embodiment, the tanks 54 are configured to be stackable with respect to each other and possibly adjoined to effectively form a larger tank 54. A first tank 54 is attached to the bottom of the apparatus 30, then a second tank 54 can be attached to the bottom of the first tank 54. A third tank 54 can then be attached to the bottom of the second tank 54, and so on. A tank 54 can be attached to another tank 54 with bolts through the threaded inserts 56 of the tanks 54. One skilled in the art will appreciate that the tanks 54 can be attached to each other via the threaded inserts 56 by any suitable mechanical fasteners such as hooks, snaps, or any other method known to those skilled in the art. Further, when multiple add-on tanks 54 are attached to the waste disposal apparatus 30, a user can utilize the through holes 57 of the add-on tanks to direct hoses through an add-on tank 54 to connect to another add-on tank 54.

A tank 54 attached to the bottom of the waste disposal apparatus 30 can serve a variety of purposes. In an embodiment, a tank 54 can be used as an additional repository for waste from the aircraft 14. In that respect, the tank 54 can be used to expand the volume of the waste receptacle 32 of the waste disposal apparatus 30 such that the waste disposal apparatus 30 can catch additional incidental waste released by the aircraft 14 when a ramp attendant services the aircraft lavatory. Alternatively, the tank 54 can be used in place of using a long waste hose to transport waste to the service cart/truck. In that scenario, the waste hose port 44 is sealed and all of the waste from the waste tube 16 of the aircraft 14 is received by a shorter waste hose spanning the distance from the waste tube 16 of the aircraft 14 to the hose mount 58 of the tank 54, disposed within the floor of the waste receptacle 32 when a tank 54 is attached to the bottom of the waste disposal apparatus 30. Alternatively, waste from the waste tube 16 of the aircraft 14 can be received by a shorter waste hose spanning the distance from the waste tube 16 of the aircraft 14 to the hose barb 60 of the tank 54. Once the one more additional tanks 54 are filled to capacity, the tanks 54 can then be emptied into the waste tank of the service cart/truck or elsewhere via a hose attached to a hose barb 60 of the tank 54. Alternatively, a tank 54 can be emptied using drains on the bottom side of the tank 54.

In a further embodiment, the tank 54 can be used to store chemical solution or rinse water to be used to restock the aircraft lavatory during servicing. The chemical solution can be distributed from the tank 54 to the aircraft 14 via a short rinse/refill hose, with a pump, spanning the distance from the hose barb 60 to the rinse/refill tube 18 of the aircraft 14. The short rinse/refill hose can snake from the hose barb 60 through the rinse/refill hose port 46 and to the rinse/refill tube 18 or, in the alternative, can go from the hose barb 60 to the rinse/refill tube 18 without going through the rinse/refill hose port 46. Alternatively, the chemical solution can be distributed from the tank 54 to the aircraft 14 via a short rinse/refill hose, with a pump, spanning the distance from the hose mount 58 to the rinse/refill tube 18 of the aircraft 14. The short rinse/refill hose can either go directly from the hose mount 58 of the tank 54, disposed beneath the raised floor panel 51 of the waste receptacle 32 when a tank 54 is attached to the bottom of the waste disposal apparatus 30, to the rinse/refill tube 18 or, in the alternative, snake from the house mount 58 recessed on the top of the tank 54, around the side of the tank 54, and connect to the rinse/refill tube 18 with or without going through the rinse/refill hose port 46. Further, if more than one add-on tank 54 is being used, the rinse/refill hose can be passed through a secondary rinse/refill hose port beneath the raised floor panel 51 of the waste disposal apparatus 30, through a through hole 57 of the first add-on tank 54, and to the hose mount 58 of the second add-on tank 54.

Thus, the apparatus is capable of supporting several tanks attached to the posterior of the apparatus. The optional tanks can serve a variety of purposes. One or several tanks could be used as "overflow" tanks for the receptacle. Further, in addition to or in place of an overflow tank, a tank could be used as a waste storage tank either in place of or in addition to the waste storage tank on a service cart/truck. Similarly, in addition to or in place of an overflow tank or a waste storage tank, a tank could be used as a chemical solution or rinse water storage tank either in place of or in addition to the chemical solution tank on a service cart/truck.

Following the drainage of the waste from the aircraft lavatory, the attendant disconnects the coupling allowing it to fall into waste disposal apparatus 30. Alternatively, the attendant can stow or mount the coupling in the waste disposal apparatus 30. The attendant then closes the waste tube cap 26. The attendant then attaches coupling of rinse/refill hose located within the workspace of the waste disposal apparatus 30 to the rinse/refill hose male flange by rotating and thereby locking the tubes together. Still operating within the interior of the waste disposal apparatus 30, the attendant then activates switch to start the refill pump in order to replenish the aircraft lavatory tanks with chemical solution. Thus, the attendant does not need to lower the waste disposal apparatus 30 and remove his or her hands from the glove members 52, which would increase the chances of contamination. Following the filling of the storage tank of aircraft lavatory with chemical solution, the attendant disconnects the rinse/refill coupling from the flange, allowing all spillage and backwash of chemical solution to fall into the waste receptacle 32 apparatus 30, through the drain port 50, and subsequently into the waste tank of the service cart/truck.

Referring now to FIGS. 7A-7E, in another aspect of the present invention, the waste disposal apparatus 30 may be supported by a stand 62 to bear the weight of the waste disposal apparatus 30 and further facilitate its use. During use, waste is received by the waste receptacle 32 of the waste disposal apparatus 30. As the weight of the waste disposal apparatus 30 increases, it becomes more difficult for a ramp attendant to hold the waste disposal apparatus 30 against the fuselage 12 of an aircraft 14. Should the waste disposal apparatus 30 fall away from the aircraft 14, waste may spill to the tarmac or onto individual workers, thereby resulting in the hazards described in the background of the invention. Thus, a stand 62 may be used to help bear the weight of the waste disposal apparatus 30.

The stand 62 may take a variety of forms. In an embodiment, the stand 62 is a platform. In an alternative embodiment, the platform may include wheels operatively connected to the platform to allow free movement of the stand 62. In a further embodiment, the platform may include a handle to permit the platform to be pulled or pushed. In yet another embodiment, the stand 62 includes a manual or powered scissor lift. Further, the stand 62 can include a series of connected manual or powered scissor lifts stacked on top of one another to allow the waste disposal apparatus 30 to be further raised into the air to reach the access panel 10 on a variety of different aircrafts 14.

In yet a further embodiment, the stand 62 may be operatively connected to a service cart/truck and may be adjustable for use with any model of aircraft. In particular, the stand 62 may include an apparatus having braces for attaching the waste disposal apparatus 30 to the stand 62, a platform on which an attendant may stand, and an adjustable vertical segment attaching the platform to the service cart/truck.

Advantageously, the waste disposal apparatus 30 of the present invention avoids the problems of traditional waste disposal systems, as described in the background of the invention. With previous waste disposal systems, if the volume of waste discharged from the aircraft exceeds the volume that the system is capable of handling (e.g., in the case of a large aircraft), the systems would likely overflow. Waste overflowing from the waste disposal system could lead to the ramp attendant, the aircraft ramp, the tarmac, customer baggage, and other property on the ramp becoming contaminated with human waste and chemical solutions used to deodorize and sanitize aircraft lavatories. Thus, in all scenarios except where the previous waste disposal systems are used on small aircrafts, the previous waste disposal systems are prone to exacerbate the problem of exposure to waste instead of helping to solve the problem.

Further, the waste disposal apparatus 30 of the present invention provides a multitude of benefits over traditional waste disposal systems, as will be appreciated by one of ordinary skill in the art. First, the various hoses associated with servicing a large volume aircraft lavatory are passed through the waste disposal apparatus 30 of the present invention via ports instead of the hoses being secured to the apparatus, as with previous waste disposal systems. Providing pass through ports offers the benefit of universality of the waste disposal apparatus of the present invention 30. Second, the waste disposal apparatus 30 features a modular interface insert 34 that can be changed depending on the needs or preferences of the individual user. Third, a portion of the waste disposal apparatus 30 is foldable to facilitate an efficient use of space when storing the waste disposal apparatus 30 in between uses. Fourth, the waste disposal apparatus 30 optionally includes add-on tanks 54 which can be secured to the bottom of the waste disposal apparatus 30. The add-on tanks 54 can be used as additional repositories for waste caught in the waste receptacle 32 of the waste disposal apparatus 30. Further, the add-on tanks 54 can be filled with chemical solution and used as a source of chemical solution when servicing the aircraft lavatory. A user can attach any number of add-on tanks 54 to the bottom of the waste disposal apparatus 30. Other advantages and technical effects of the embodiments of this invention will become evident to one skilled in the art from the following description.

Due to the modularity of the waste disposal apparatus 30, the waste disposal apparatus 30 can be used in at least three different ways. First, the waste disposal apparatus 30 can be used simply as a personal protective shield for an attendant servicing an aircraft 14 lavatory. In this way, the waste disposal apparatus 30 can be used primarily as a shield to protect an attendant from any inadvertent waste or chemical solution discharge while the attendant is servicing the aircraft 14 lavatory. When the waste disposal apparatus 30 is used as a personal protective shield, no lavatory service hoses (e.g., waste hose, and rinse/refill hose) attach to the waste disposal apparatus 30.

Second, the waste disposal apparatus 30 can be used in conjunction with at least one add-on tank 54 and without the use of hoses (e.g., waste hose, and rinse/refill hose) from a lavatory servicing cart. This eliminates the need to use an industry standard 4-inch waste hose attached to a lavatory service vehicle. In this way, the waste disposal apparatus 30 operates as an all-in-one, standalone apparatus for servicing an aircraft lavatory. The waste disposal apparatus 30 could feature one add-on tank 54, attached to the bottom of the waste disposal apparatus 30, to allow waste to flow from the aircraft 14 through a secondary waste hose port located below the raised floor panel 51 of the waste disposal apparatus 30 and into the tank 54 attached to the bottom of the waste disposal apparatus 30. The waste in the add-on tank 54 is then pumped out or drained at will when the waste disposal apparatus 30 is stowed. In addition, or separately, the waste disposal apparatus 30 could feature a second add-on tank 54 with filled chemical solution that could be used to replenish an aircraft's 14 stock of chemical solution. The rinse/refill hose connecting the add-on tank 54 to the rinse/refill tube 18 passes through a secondary rinse/refill hose port located below the raised floor panel 51. In the event that the waste disposal apparatus 30 features at least one add-on tank 54 for waste and at least one add-on tank 54 for chemical solution, the rinse/refill hose, after passing through the secondary rinse/refill port in the raised floor panel 51, would further pass through a through hole 57 in the first add-on tank 54 attached to the bottom of the waste disposal apparatus 30 in order to connect to the second add-on tank 54 containing the chemical solution. This represents a marked departure from the current service procedure for aircrafts 14.

Third, the waste disposal apparatus 30, with or without one or more add-on tanks 54, can be used in conjunction with various types of stands 62 which can be adapted to existing aircraft service vehicles or carts. For example, the waste disposal apparatus 30 could be used with a lift gate and support arm assembly to become a self-supporting, standalone, gate lift cart. This eliminates the need for a secondary vehicle specifically to tow the waste disposal apparatus 30 and stand 62. In this way, the waste disposal apparatus 30 in conjunction with various types of stands 62 could fulfill the role of a full-service gate lift cart for aircrafts 14 of virtually any size, ranging from small aircrafts 14 to large aircrafts 14. Furthermore, the assembly can be adapted to accommodate existing vehicle mounting capabilities. For example, the waste disposal apparatus 30 can be mounted to existing lavatory truck bumpers as well as lift bucket vehicles. Existing lavatory carts could be used as storage tanks to service the waste disposal apparatus 30 at the gate.

While the present invention has been illustrated by the description of various preferred embodiments and while these embodiments have been described in some detail, it is not the intention of the Applicant to restrict or in any way limit the scope of the appended claims to such detail. The various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A waste disposal apparatus for servicing a lavatory of an aircraft, the waste disposal apparatus comprising:

an open-top waste receptacle for accidental fallout of a waste debris or a chemical solution from the aircraft, the waste receptacle including a plurality of sidewalls that are joined to and extend upwardly from a floor, the plurality of sidewalls further joined to each other at their side edges, the floor and the plurality of sidewalls together forming a bounds of a workspace within an interior of the waste disposal apparatus; and a plurality of hose ports disposed within the plurality of sidewalls of the waste receptacle, the plurality of hose ports comprising:

a waste hose port, the waste hose port configured to facilitate a transport of waste from the aircraft by allowing a waste hose to extend from an exterior of the waste disposal apparatus through to the interior of the waste disposal apparatus, the waste hose not connected to the waste hose port and free to move within the waste hose port; and a rinse/refill hose port, the rinse/refill hose port configured to facilitate a transport of the chemical solution to the aircraft by allowing a rinse/refill hose to extend from the exterior of the waste disposal apparatus through to the interior of the waste disposal apparatus, the rinse/refill hose not connected to the rinse/refill hose port and free to move within the rinse/refill hose port.

2. The waste disposal apparatus of claim 1, wherein the plurality of sidewalls includes a tall sidewall that forms a barrier between a user and the interior of the waste receptacle.

3. The waste disposal apparatus of claim 2, wherein the waste disposal apparatus includes an orifice disposed within the tall sidewall, the orifice configured to allow the user to extend their hands from the exterior of the waste disposal apparatus into the workspace of the interior of the waste disposal apparatus, and wherein the waste disposal apparatus further includes an interface insert disposed within the orifice, the interface insert configured to allow the user to customize the orifice.

4. The waste disposal apparatus of claim 3, the interface insert including a plurality of vertically oriented vinyl strips covering the orifice, the vinyl strips configured to offer a penetrable barrier between the interior and exterior of the waste disposal apparatus.

5. The waste disposal apparatus of claim 3, the interface insert including two smaller orifices, each of the two smaller orifices including a glove member operatively connected at a cuff to the orifice, the glove member extending from the interface insert into the workspace of the interior of the waste disposal apparatus.

6. The waste disposal apparatus of claim 1, wherein the waste disposal apparatus includes a face shield disposed atop and operatively connected to a sidewall of the plurality of sidewalls, a substantial portion of the face shield substantially transparent to allow viewing of the workspace of the interior of the waste disposal apparatus from the exterior of the waste disposal apparatus, and wherein the face shield is configured to pivot between a substantially vertical position and a substantially horizontal position by foldable devices that include a locking and releasing feature as to be foldable for purposes of storage between uses.

7. The waste disposal apparatus of claim 6, wherein the face shield includes a video display system configured to permit a user to view the workspace of the interior of the waste disposal apparatus.

8. The waste disposal apparatus of claim 1, wherein the floor of the waste receptacle is sloped to form a spill trap, the floor of the waste receptacle sloped towards a drain port located in the floor, the spill trap configured to catch accidental fallout of the waste debris or the chemical solution and direct the waste debris or the chemical solution out of the waste receptacle.

9. The waste disposal apparatus of claim 1, the plurality of hose ports further comprising:

an electric wire port, the electric wire port configured to facilitate the passing through of a wiring from the exterior of the waste disposal apparatus through to the interior of the waste disposal apparatus.

10. The waste disposal apparatus of claim 1, wherein the waste disposal apparatus is mounted to a stand, the stand bearing a weight of the waste disposal apparatus and configured to facilitate the use of the waste disposal apparatus with the aircraft, and wherein the stand is operatively connected to a service cart/truck to enhance a mobility and operability of the waste disposal apparatus.

11. A waste disposal system for servicing a lavatory of an aircraft, the waste disposal system comprising:

a waste disposal apparatus, the waste disposal apparatus comprising:

an open-top waste receptacle for accidental fallout of a waste debris or a chemical solution from the aircraft, the waste receptacle including a plurality of sidewalls that are joined to and extend upwardly from a floor, the plurality of sidewalls further joined to each other at their side edges, the floor and the plurality of sidewalls together forming a bounds of a workspace within an interior of the waste disposal apparatus; and at least one tank releasably fastened to a bottom of the waste disposal apparatus, the at least one tank configured to expand a storage capability of the waste disposal apparatus, the at least one tank including a threaded insert configured to facilitate fastening of the at least one tank to the waste disposal apparatus and further configured to facilitate fastening of one or more additional tanks to the at least one tank.

12. The waste disposal system of claim 11, the at least one tank configured to expand a volume of the waste receptacle for accidental fallout of the waste debris or the chemical solution from the aircraft.

13. The waste disposal system of claim 11, the at least one tank configured to receive waste from the aircraft by a waste hose, the waste hose extending from the aircraft to the at least one tank.

14. The waste disposal system of claim 11, the at least one tank configured to store the chemical solution, the chemical solution transferred to the aircraft by a rinse/refill hose extending from the at least one tank to the aircraft.

15. The waste disposal system of claim 11, further comprising:

a plurality of hose ports disposed within the plurality of sidewalls of the waste receptacle, the plurality of hose ports comprising:

a waste hose port, the waste hose port configured to facilitate a transport of waste from the aircraft by allowing a waste hose to extend from an exterior of the waste disposal apparatus through to the interior of the waste disposal apparatus, the waste hose not connected to the waste hose port and free to move within the waste hose port; and a rinse/refill hose port, the rinse/refill hose port configured to facilitate a transport of the chemical solution to the aircraft by allowing a rinse/refill hose to extend from the exterior of the waste disposal apparatus through to the interior of the waste disposal apparatus, the rinse/refill hose not connected to the rinse/refill hose port and free to move within the rinse/refill hose port.

16. The waste disposal system of claim 11, wherein the waste disposal system is mounted to a stand, the stand bearing a weight of the waste disposal system and configured to facilitate the use of the waste disposal system with the aircraft, and wherein the stand is operatively connected to a service cart/truck to enhance a mobility and operability of the waste disposal system.

17. A method of servicing a lavatory of an aircraft, the method comprising:

providing a waste disposal apparatus, the waste disposal apparatus comprising:

an open-top waste receptacle, the waste receptacle including a plurality of sidewalls that are joined to and extend upwardly from a floor, the plurality of sidewalls further joined to each other at their side edges, the floor and the plurality of sidewalls together forming a bounds of a workspace within an interior of the waste disposal apparatus; and a plurality of hose ports disposed within the plurality of sidewalls of the waste receptacle, the plurality of hose ports comprising:

a waste hose port, the waste hose port configured to facilitate a transport of waste from the aircraft; and a rinse/refill hose port, the rinse/refill hose port configured to facilitate a transport of a chemical solution to the aircraft;

extending a waste hose from an exterior of the waste disposal apparatus through the waste hose port and into the interior of the waste disposal apparatus, the waste hose not connected to the waste hose port and free to move within the waste hose port;

extending a rinse/refill hose from the exterior of the waste disposal apparatus through the rinse/refill hose port to the interior of the waste disposal apparatus, the rinse/ refill hose not connected to the rinse/refill hose port and free to move within the rinse/refill hose port; and catching accidental fallout of the waste debris or the chemical solution from the aircraft during the servicing in the waste receptacle of the waste disposal apparatus.

18. The method of servicing a lavatory of an aircraft of claim 17, wherein the plurality of sidewalls includes a tall sidewall that forms a barrier between a user and the interior of the waste receptacle.

19. The method of servicing a lavatory of an aircraft of claim 17, the method further comprising:

releasably fastening at least one tank to a bottom of the waste disposal apparatus, the at least one tank configured to expand a storage capability of the waste disposal apparatus, the at least one tank including a threaded insert configured to facilitate fastening of the at least one tank to the waste disposal apparatus and further configured to facilitate fastening of one or more additional tanks to the at least one tank.

20. The method of servicing a lavatory of an aircraft of claim 17, the method further comprising:

mounting the waste disposal apparatus to a stand, the stand bearing a weight of the waste disposal apparatus and configured to facilitate the use of the waste disposal apparatus with the aircraft; and operatively connecting the stand to a service cart/truck to enhance a mobility and operability of the waste disposal apparatus.

* * * * *